US010501591B2

(12) United States Patent
Heimink et al.

(10) Patent No.: US 10,501,591 B2
(45) Date of Patent: Dec. 10, 2019

(54) PRESSURE SENSITIVE ADHESIVE ASSEMBLY SUITABLE FOR BONDING TO UNEVEN SUBSTRATES

(71) Applicant: 3M INNOVATIVE PROPERTIES COMPANY, St. Paul, MN (US)

(72) Inventors: Jan Heimink, Schwelm (DE); Kerstin Unverhau, Neuss (DE); Andreas Backes, Kaarst (DE); Adrian T. Jung, Kaarst (DE); Dirk Hasenberg, Raeren (BE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 289 days.

(21) Appl. No.: 15/316,610

(22) PCT Filed: Jul. 15, 2015

(86) PCT No.: PCT/US2015/040567
§ 371 (c)(1),
(2) Date: Dec. 6, 2016

(87) PCT Pub. No.: WO2016/011152
PCT Pub. Date: Jan. 21, 2016

(65) Prior Publication Data
US 2017/0210950 A1    Jul. 27, 2017

(30) Foreign Application Priority Data
Jul. 17, 2014 (EP) ..................... 14177515

(51) Int. Cl.
C08J 5/00 (2006.01)
C09J 7/00 (2018.01)
C08J 5/06 (2006.01)
C09J 7/26 (2018.01)

(52) U.S. Cl.
CPC . C08J 5/06 (2013.01); C09J 7/26 (2018.01); C09J 2201/606 (2013.01); C09J 2201/622 (2013.01); C09J 2433/006 (2013.01)

(58) Field of Classification Search
CPC ......... C08J 5/00; C08J 5/06; C08J 7/00; C08J 7/20; C08J 7/26
See application file for complete search history.

(56) References Cited

U.S. PATENT DOCUMENTS

| | | |
|---|---|---|
| 4,415,615 A | 11/1983 | Esmay et al. |
| 5,721,289 A | 2/1998 | Karim et al. |
| 5,877,261 A | 3/1999 | Harder et al. |
| 5,939,477 A | 8/1999 | Pretzer |
| 6,169,138 B1 | 1/2001 | Petit |
| 6,777,079 B2 | 8/2004 | Zhou et al. |
| 7,147,742 B2 | 12/2006 | Kirsten |
| 7,273,580 B2 | 9/2007 | Kirsten et al. |
| 7,651,580 B2 | 1/2010 | Sauer et al. |
| 7,879,441 B2 | 2/2011 | Gehlsen et al. |
| 7,910,163 B2 | 3/2011 | Zollner et al. |
| 8,025,756 B2 | 9/2011 | Roos et al. |
| 8,449,962 B2 | 5/2013 | Prenzel et al. |
| 8,802,777 B2 | 8/2014 | Zöllner et al. |
| 2001/0045640 A1 | 11/2001 | Oida et al. |
| 2004/0241417 A1 | 12/2004 | Fischer |
| 2010/0137524 A1 | 6/2010 | Grittner et al. |
| 2010/0218932 A1 | 9/2010 | Fischer et al. |
| 2011/0111221 A1 | 5/2011 | Schumann |
| 2011/0281964 A1 | 11/2011 | Zmarsly et al. |
| 2012/0029105 A1 | 2/2012 | Czerwonatis et al. |
| 2013/0344276 A1 | 12/2013 | Seitz |
| 2014/0057091 A1 | 2/2014 | Krawinkel |
| 2014/0170326 A1 | 6/2014 | Grittner et al. |

FOREIGN PATENT DOCUMENTS

| | | |
|---|---|---|
| DE | 20 2009 013 255 | 3/2010 |
| EP | 0 730 016 | 9/1996 |
| EP | 0 798 354 | 10/1997 |
| EP | 0933410 A2 | 8/1999 |
| WO | WO 2008/070386 | 6/2008 |
| WO | WO 2010/101738 | 9/2010 |
| WO | WO 2011/107351 | 9/2011 |
| WO | WO 2013/055581 | 4/2013 |
| WO | WO 2014/081623 | 5/2014 |
| WO | WO 2014/186316 | 11/2014 |

OTHER PUBLICATIONS

PCT International Search Report from PCT/US2015/040567, dated Sep. 7, 2015, 3 pages.

*Primary Examiner* — Jacob T Minskey
*Assistant Examiner* — Matthew Hoover
(74) *Attorney, Agent, or Firm* — 3M IPC; Carlos M. Téllez

(57) ABSTRACT

The present disclosure relates to a pressure sensitive adhesive assembly suitable for bonding to a substrate provided with an uneven surface, wherein the pressure sensitive adhesive (PSA) assembly comprises a polymeric foam layer comprising a polymeric base material, and having a complex viscosity comprised between 2,000 Pa·s to 80,000 Pa·s, when measured at 120C according to the test method described in the experimental section. The present disclosure is also directed to a method of applying a pressure sensitive adhesive assembly to a substrate provided with an uneven surface, and uses thereof.

15 Claims, No Drawings

PRESSURE SENSITIVE ADHESIVE ASSEMBLY SUITABLE FOR BONDING TO UNEVEN SUBSTRATES

TECHNICAL FIELD

The present disclosure relates generally to the field of adhesives, more specifically to the field of pressure sensitive adhesives (PSA). The present disclosure also relates to a method of applying such pressure sensitive adhesives and uses thereof.

BACKGROUND

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives.

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

Pressure sensitive adhesives (PSAs) are well known to one of ordinary skill in the art, and according to the Pressure-Sensitive Tape Council, PSAs are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive adhesive tapes over the years, performance requirements have become more demanding. Shear holding capability, for example, which originally was intended for applications supporting modest loads at room temperature, has now increased substantially for many applications in terms of operating temperature and load. Indeed, many applications require pressure sensitive adhesives to support a load at elevated temperatures, typically in the range of from 70° C. to 90° C., for which high cohesive strengths are required. So-called high performance pressure-sensitive tapes are those capable of supporting loads at elevated temperatures for 10,000 minutes. Increased shear holding capability may generally be accomplished by crosslinking the PSA, although considerable care must be exercised so that high levels of tack and adhesion are retained in order to retain the aforementioned balance of properties.

In addition, when used as attachment devices for a variety of assembly and manufacturing applications, such as interior or exterior automotive mounting of panels and molding, or in the construction industry, pressure sensitive adhesives are additionally required to provide good adhesion performance to uneven or irregular surfaces. In that context, the application of PSA foam tapes to uneven or irregular surfaces is a recognized challenge, since the conformability of the adhesive tape is limited. In some specialized applications, such as taped seal on body and weather-strip tape applications for the automotive industry, successful tape application is rather challenging, especially in small radii in car bodies and critical topologies such as spot welds or other surface structures, since the adhered tape needs to combine two rather contradicting requirements. On the one hand, the tape has to resist high deformation forces, therefore high stress relaxation capabilities and good cohesive strength are required. On the other hand, the same unique tape needs to provide sufficient conformability to the uneven or irregular surface, and therefore excellent surface wetting capabilities are required for the tape.

It is therefore a recognized and continuous challenge in the adhesive tapes industry to provide pressure sensitive adhesive assemblies combining good adhesion, good stress relaxation and good cohesion properties. In order to optimize the adhesion of the PSA assembly to uneven or irregular substrates, an excellent surface wetting is additionally required.

Partial solutions have been described in the art, whereby a non- or very low crosslinked adhesive is applied to a surface and then post-cured, so that, after an adequate surface wetting, the cohesive strength can be built up. In that context, the so-called "semi-structural tapes" described e.g. in U.S. Pat. No. 5,721,289 (Karim et al.) have been used. These systems are based on post-curable epoxy functionalities and specifically require using a superacid which is activated by UV irradiation as triggering energy. Other known post-curable systems are based on the so-called "DICY-chemistry" described e.g. in EP-A1-0798354, wherein an epoxy-amine curing reaction is triggered with heat. The post-curable systems described in the art typically require complex handling of pre-adhesive compositions including carefully controlled curing or crosslinking steps. Also, the described partial solutions generally do not provide industrially viable solutions for the production of pressure sensitive adhesives having acceptable characteristics, in particular for specialized applications, such as taped seal on body and weather-strip tape applications, whereby successful tape application is required on challenging topologies such as spot welds.

Without contesting the technical advantages associated with the pressure sensitive adhesive films known in the art, there is still a need for a cost-effective pressure sensitive adhesive assembly having versatile adhesion and cohesive characteristics, in particular with respect to adhesion, stress relaxation and cohesion properties, whilst providing excellent surface wetting properties on substrates provided with uneven or irregular surfaces.

Other advantages of the pressure sensitive adhesive (PSA) assembly and methods of the disclosure will be apparent from the following description.

SUMMARY

According to one aspect, the present disclosure relates to a pressure sensitive adhesive assembly suitable for bonding to a substrate provided with an uneven surface, wherein the pressure sensitive adhesive (PSA) assembly comprises a polymeric foam layer comprising a polymeric base material, and having a complex viscosity comprised between 2,000 Pa·s to 80,000 Pa·s, when measured at 120° C. according to the test method described in the experimental section.

In another aspect, the present disclosure relates to a method of applying a pressure sensitive adhesive assembly to a substrate provided with an uneven surface, which comprises the steps of:
a) subjecting the polymeric foam layer as described above to a heating step;
b) contacting the heated polymeric foam layer obtained in step a) to the uneven surface of the substrate; and
c) allowing the polymeric foam layer to cool down on the substrate.

According to still another aspect, the present disclosure relates to the use of a curable precursor of a pressure sensitive adhesive as above described, for industrial applications, in particular for construction applications and automotive applications.

DETAILED DESCRIPTION

According to a first aspect, the present disclosure relates to a pressure sensitive adhesive assembly suitable for bonding to a substrate provided with an uneven surface, wherein the pressure sensitive adhesive (PSA) assembly comprises a polymeric foam layer comprising a polymeric base material and having a complex viscosity comprised between 2,000 Pa·s to 80,000 Pa·s, when measured at 120° C. according to the test method described in the experimental section.

In the context of the present disclosure, it has surprisingly been found that a pressure sensitive adhesive assembly comprising a polymeric foam layer comprising a polymeric base material and having a complex viscosity comprised between 2,000 Pa·s to 80,000 Pa·s, when measured at 120° C. according to the test method described in the experimental section, is outstandingly suitable for bonding to a substrate provided with an uneven surface. Without wishing to be bound by theory, it is believed that this outstanding suitability is due in particular to the specific complex viscosity range fulfilled by the polymeric foam layer for use herein, and which has been identified as providing excellent surface wetting properties on substrates provided with uneven or irregular surfaces.

In the context of the present disclosure, the expressions "uneven surface" and "irregular surface" are used interchangeably, and are typically meant to refer to a surface which is discontinuous and/or non-flat and/or non-horizontal. Throughout the present disclosure, the expression "uneven surface" is preferably intended to refer to a surface typically provided with at least one structure selected from the group consisting of cavities, holes, apertures, orifices, pits, openings, gaps, troughs, edges, depressions, elevations, and any combinations thereof.

The use of the pressure sensitive adhesive assembly and method of the present disclosure affords a number of advantages when compared to pressure sensitive adhesives obtained e.g. with post-curable systems. These advantages include, but are not limited to, easier handling of the compounds and compositions; easier manufacturing method, in particular less complex curing or crosslinking steps involved; ability to use already cured pressure sensitive adhesive layers; improved suitability for specialized applications, such as taped seal on body and weather-strip tape applications; and enhanced bonding to challenging topologies such as spot welds.

In addition, the pressure sensitive adhesives of the present disclosure exhibit high peel strength, high cohesive strength, high temperature shear strength, and excellent stress relaxation properties. The pressure-sensitive adhesives according to the present disclosure, i.e. in the cured state, provide the desired balance of tack, peel adhesion, and shear holding power.

The pressure sensitive adhesive assemblies according to the disclosure may find particular use for industrial applications, in particular for construction applications, aerospace applications, and automotive applications, more in particular for taped seal on body, taped seal on door, exterior parts attachment and weather-strip tape applications for the automotive industry.

As used herein, the term "alkyl (meth)acrylate" and "alkyl (meth)acrylate ester" are used interchangeably. The term "(meth)acrylate" refers to an acrylate, methacrylate, or both. The term "(meth)acrylic" refers to methacrylic, acrylic, or both. A (meth)acrylic-based" material refers to one prepared from one or more monomers having a (meth)acryloyl group, which is a group of formula $CH_2=C(R)-(CO)-$ where R is hydrogen or methyl.

The term "alkyl" refers to a monovalent group which is a saturated hydrocarbon. The alkyl can be linear, branched, cyclic, or combinations thereof and typically has 1 to 32 carbon atoms. In some embodiments, the alkyl group contains 1 to 25, 1 to 20, 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, 2-ethylhexyl, 2-octyl, iso-octyl and 2-propylheptyl.

As used herein, the term "heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent.

As used herein, "aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

According to the present disclosure, the pressure sensitive adhesive assembly comprises a polymeric foam layer comprising a polymeric base material.

In the context of the present invention, the term "polymeric foam" is meant to designate a material based on a polymer and which material comprises voids, typically in an amount of at least 5% by volume, typically from 10% to 55% by volume or from 10% to 45% by volume. The voids may be obtained by any of the known methods such as cells formed by gas. Alternatively, the voids may result from the incorporation of hollow fillers, such as hollow polymeric particles, hollow glass microspheres or hollow ceramic microspheres.

A polymeric foam layer for use herein has for example a thickness comprised between 100 and 6000 μm, between 200 and 4000 μm, between 500 and 2000 μm, or even between 800 and 1500 μm. As will be apparent to those skilled in the art, in the light of the present description, the preferred thickness of the polymeric foam layer will be dependent on the intended application.

A polymeric foam layer typically has a density comprised between 0.45 g/cm$^3$ and 1.5 g/cm$^3$, between 0.45 g/cm$^3$ and 1.10 g/cm$^3$, between 0.50 g/cm$^3$ and 0.95 g/cm$^3$, between 0.60 g/cm$^3$ and 0.95 g/cm$^3$, or even between 0.70 g/cm$^3$ and 0.95 g/cm$^3$. This density is achieved by including voids or cells. Typically, the polymeric foam layer will comprise at least 5% of voids by volume and for example between 15 and 45%, or between 20% and 45% by volume.

The voids or cells in the polymeric foam layer can be created in any of the known manners described in the art and include the use of a gas or blowing agent and/or including hollow particles into the composition for the polymeric foam layer. For example, according to one method to create a polymeric foam described in U.S. Pat. No. 4,415,615, an acrylic foam can be obtained by the steps of (i) frothing a composition containing the acrylate monomers and optional comonomers, (ii) coating the froth on a backing and (iii) polymerizing the frothed composition. It is also possible to coat the unfrothed composition of the acrylate monomers and optional comonomers to the backing and to then simultaneously foam and polymerize that composition. Frothing of the composition may be accomplished by whipping a gas into the polymerizable composition. Preferred gasses for this purpose are inert gasses such as nitrogen and carbon dioxide, particularly if the polymerization is photoinitiated.

According to a particular aspect of the present disclosure, the polymeric base material for use herein is selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, halogenated polymers, and any combinations, copolymers or mixtures thereof.

In a preferred aspect, the main monomer component of the polymeric base material is selected from the group consisting of (meth)acrylate esters, (meth)acrylate monoesters of polyhydroxy alkyl alcohols, multifunctional (meth)acrylate esters, macromeric (meth)acrylates, (meth)acrylic acids and their salts, nitrogen-bearing monomers, dibasic acid monomers, vinyl esters, styrenes and ring-substituted styrenes, vinyl halides and vinylidene halides, vinyl ethers, and any combinations or mixtures thereof.

In a more preferred aspect, the polymeric base material for use herein is selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

According to still a preferred aspect, the polymeric base material for use herein is selected from the group consisting of polyacrylates whose main monomer component comprises a linear or branched alkyl (meth)acrylate ester selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl(meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

In a more preferred aspect, the polymeric base material for use herein is selected from the group consisting of polyacrylates whose main monomer component is selected from the group consisting of iso-octyl (meth)acrylate, 2-ethylhexyl (meth)acrylate, 2-propylheptyl (meth)acrylate, 2-octyl (meth)acrylate, butyl acrylate, and any combinations or mixtures thereof; more preferably from the group consisting of iso-octyl acrylate, 2-ethylhexyl acrylate, 2-octyl acrylate, and 2-propylheptyl acrylate.

In still a preferred aspect, the polymeric base material for use herein is selected from the group consisting of 2-ethylhexyl acrylate, and iso-octyl acrylate. In a particularly preferred aspect, the polymeric base material for use herein comprises or consists of 2-ethylhexyl acrylate.

According to an alternative aspect, the polymeric base material for use herein is selected to comprise 2-octyl(meth)acrylate. Polymer base material derived from 2-octyl (meth)acrylate provides comparable adhesive properties when compared with other isomers of octyl (meth)acrylate, such as n-octyl and isooctyl. Further, the pressure sensitive adhesive compositions typically have lower inherent and solution viscosities when compared to adhesive compositions derived from other octyl isomers, such as isooctyl acrylate, at the same concentrations, and under the same polymerization conditions.

The 2-octyl (meth)acrylate may be prepared by conventional techniques from 2-octanol and (meth)acryloyl derivates such as esters, acids and acyl halides. The 2-octanol may be prepared by treatment of ricinoleic acid, derived from castor oil, (or ester or acyl halide thereof) with sodium hydroxide, followed by distillation from the co-product sebacic acid.

It is however preferred that the 2-octyl(meth)acrylate monomer for use herein is at least partly, preferably completely (i.e. 100 wt %) derived from biological material, more preferably from a plant material. This may advantageously be used to provide adhesive films/tapes which are at least partly derived from "green" sources, which is ecologically more sustainable and also reduces the dependency on mineral oil and the price development.

In the context of the present disclosure, the term "derived from biological material" is meant to express that from a certain chemical ingredient, at least a part of its chemical structure comes from biological materials, preferably at least 50 wt % of its structure. This definition is in principle the same as for bio-diesel fuel, in which usually only the fatty acid part originates from biological sources whereas the methanol may also be derived from fossil material like coal or mineral oil.

Accordingly, in one particular aspect, at least 50 wt %, at least 75 wt %, or even 100 wt % of the chemical structure of the 2-octyl(meth)acrylate is at least partly, preferably completely (i.e. 100 wt %) derived from biological material, more preferably from a plant material.

The main monomer component(s) of the polymeric base material for use herein, in particular the (meth)acrylate ester monomer(s), may be present in the (co)polymerizable material (curable precursor of the polymeric base material), in any suitable amounts. In some exemplary aspects, the main monomer component(s) of the polymeric base material are present in amounts up to 100 parts by weight, up to 90 parts by weight, or even up to 80 parts by weight of the polymerizable material. In some other exemplary aspects, this amount is typically of at least 50 parts by weight, or at least 60 parts by weight of the polymerizable material. Accordingly, in some exemplary aspects, the main monomer component(s) of the polymeric base material are present in amounts in a range of from 50 to 100 parts, from 60 to 95 parts by weight, from 65 to 90 parts, or even from 65 to 80 parts by weight of the polymerizable material.

According to a particular aspect, the polymeric base material for use herein may further comprise an optional co-monomer having an ethylenically unsaturated group. Suitable co-monomer(s) having an ethylenically unsaturated group for use herein will be easily identified by those skilled in the art, in the light of the present description. As such, co-monomer(s) having an ethylenically unsaturated group for use herein are not particularly limited.

In one typical aspect, the co-monomer(s) having an ethylenically unsaturated group include, but are not limited to, the group of polar monomers, in particular acid or non-acid functional polar monomers. According to a more particular aspect, the polymer base material for use herein further comprises a polar co-monomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines, lactames and substituted lactames, and any combinations or mixtures thereof.

In an advantageous aspect of the present disclosure, the co-monomer(s) having an ethylenically unsaturated group are selected from the group of acid functional polar monomers having a single ethylenically unsaturated group. In a preferred aspect, the co-monomer(s) having an ethylenically unsaturated group comprises acrylic acid (co)monomer(s).

The co-monomer(s) having an ethylenically unsaturated group for use herein may be present in the (co)polymerizable material, in any suitable amounts. In some exemplary aspects, the co-monomer(s) having an ethylenically unsaturated group are present in amounts up to 40 parts by weight, up to 35 parts by weight, or even up to 30 parts by weight of the (co)polymerizable material. In some other exemplary aspects, this amount is typically of at least 2 parts by weight, or at least 5 parts by weight of the (co)polymerizable material.

Accordingly, in some exemplary aspects, the co-monomer(s) having an ethylenically unsaturated group are present in amounts in a range of from 0 to 40 parts, from 5 to 35 parts by weight, or even from 20 to 35 parts by weight of the (co)polymerizable material. In some other exemplary aspects, the co-monomer(s) having an ethylenically unsaturated group are present in amounts in a range of from 0 to 20 parts, from 5 to 15 parts by weight, or even from 5 to 10 parts by weight of the (co)polymerizable material.

In a particular aspect, the (co)polymerizable material comprises:
a) from 60 to 100 parts by weight, from 70 to 95 parts by weight, from 80 to 95 parts by weight or even from 85 to 95 parts by weight, of a (free-radically) polymerizable monomer, in particular a (meth)acrylate ester monomer(s); and
b) optionally, from 0 to 40 parts by weight, from 5 to 30 parts by weight, from 5 to 20 parts by weight or even from 5 to 15 parts by weight, of a co-monomer having an ethylenically unsaturated group, in particular acrylic acid monomer(s).

According to another typical aspect of the present disclosure, the (co)polymerizable material, curable precursor of the polymeric base material, comprises:
(a) a linear or branched alkyl (meth)acrylate ester as main monomer, wherein the main monomer is preferably selected from the group consisting of iso-octyl (meth) acrylate, 2-ethylhexyl (meth)acrylate, 2-propylheptyl (meth)acrylate, butyl acrylate; and
(b) optionally, a second monomer having an ethylenically unsaturated group, preferably a reinforcing monoethylenically-unsaturated monomers which is copolymerizable with the acrylate main monomer.

An initiator for free radical polymerization is typically added to the various monomers used to form the (co) polymerizable material. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of (co)polymerizable material.

In some executions, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof; an oxidation-reduction initiator such as the reaction product of a persulfate and a reducing agent such as a metabisulfite (e.g., sodium metabisulfite) or a bisulfate (e.g., sodium bisulfate); or 4,4'-azobis(4-cyanopentanoic acid) and its soluble salts (e.g., sodium, potassium). Suitable oil-soluble initiators include, but are not limited to, various azo compounds such as those commercially available under the trade designation VAZO from E. I. DuPont de Nemours Co. including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, lauroyl peroxide, and mixtures thereof.

In many executions, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J.) or under the trade designation ESACURE KB-1 from Sartomer (Exton, Pa.)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1, 2-propanedione-2-(O-ethoxycarbonyl)oxime. Other suitable photoinitiators include, for example, 1-hydroxy cyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-

(methylthio)phenyl]-2-morpholinopropan-1-one (IRGACURE 907), and 2-hydroxy-2-methyl-1-phenyl propan-1-one (DAROCUR 1173).

The particular (co)polymerizable material used to produce the polymeric foam layer may optionally further contain chain transfer agents to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture can contain 0.01 to 0.5 weight percent, 0.05 to 0.5 weight percent, or 0.05 to 0.2 weight percent chain transfer agent.

According to one particular aspect of the pressure sensitive adhesive assembly according to the present disclosure, the particular (co)polymerizable material used to produce the polymeric foam layer may further include one or more other vinyl monomers such as vinyl esters (e.g., vinyl acetate and vinyl propionate); styrene or derivatives thereof such as alkyl substituted styrene (e.g., α-methyl styrene); vinyl halide; or mixtures thereof. These monomers can be polar or non-polar. If present, these other vinyl monomer can be present in any suitable amount. In some aspects, the vinyl monomers are present in an amount of up 5 parts by weight, based on a total weight of polymerizable material. For example, the vinyl monomer can be used in amounts up to 4 weight percent, up to 3 weight percent, or up to 2 weight percent. In some particular aspects, the vinyl monomer is present in an amount in a range of 0 to 5 weight percent, 0.5 to 5 weight percent, 1 to 5 weight percent, 0 to 3 weight percent, or 1 to 3 weight percent.

The (co)polymerizable material for use herein may include an organic solvent or may be free or essentially free of an organic solvent. As used herein, the term "essentially free" in reference to an organic solvent means that the means that the organic solvent is present in an amount less than 5 weight percent, less than 4 weight percent, less than 3 weight percent, less than 2 weight percent, or less than 1 weight percent based on the weight of the polymerizable material. If an organic solvent is included in the polymerizable material, the amount is often selected to provide the desired viscosity. Examples of suitable organic solvents include, but are not limited to, methanol, tetrahydrofuran, ethanol, isopropanol, heptane, acetone, methyl ethyl ketone, methyl acetate, ethyl acetate, toluene, xylene, ethylene glycol alkyl ether, and any combinations or mixtures thereof.

According to one particular aspect of the pressure sensitive adhesive assembly according to the present disclosure, the (co)polymerizable material may further comprise a crosslinker (also referred to as crosslinking agent), preferably in an amount of up to 5 weight percent, based on the total weight of polymerizable material.

The crosslinker often increases the cohesive strength and the tensile strength of the polymerizable material. The crosslinker can have at least two functional groups which are capable of polymerizing with the main monomer or another monomer. That is, the crosslinker can have at least two ethylenically unsaturated groups. Suitable crosslinkers often have multiple (meth)acryloyl groups. Alternatively, the crosslinker can have at least two groups that are capable of reacting with various functional groups (i.e., functional groups that are not ethylenically unsaturated groups) on another monomer. For example, the crosslinker can have multiple groups that can react with functional groups such as acidic groups on other monomers.

Crosslinkers with multiple (meth)acryloyl groups can be di(meth)acrylates, tri(meth)acrylates, tetra(meth)acrylates, penta(meth)acrylates, and the like. These crosslinkers can be formed, for example, by reacting (meth)acrylic acid with a polyhydric alcohol (i.e., an alcohol having at least two hydroxyl groups). The polyhydric alcohol often has two, three, four, or five hydroxyl groups. Mixtures of crosslinkers may also be used.

In many aspects, the crosslinkers contain at least two (meth)acryloyl groups. Exemplary crosslinkers with two acryloyl groups include, but are not limited to, 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary crosslinkers with three or four (meth)acryloyl groups include, but are not limited to, trimethylolpropane triacrylate (e.g., commercially available under the trade designation TMPTA-N from Cytec Industries, Inc., Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

In some aspects, the crosslinkers are polymeric material that contains at least two (meth)acryloyl groups. For example, the crosslinkers can be poly(alkylene oxides) with at least two acryloyl groups (e.g., polyethylene glycol diacrylates commercially available from Sartomer such as SR210, SR252, and SR603) or poly(urethanes) with at least two (meth)acryloyl groups (e.g., polyurethane diacrylates such as CN9018 from Sartomer). As the higher molecular weight of the crosslinkers increases, the resulting acrylic copolymer tends to have a higher elongation before breaking. Polymeric crosslinkers tend to be used in greater weight percent amounts compared to their non-polymeric counterparts.

Other types of crosslinkers can be used rather than those having at least two (meth)acryloyl groups. The crosslinker can have multiple groups that react with functional groups such as acidic groups on other second monomers. For example, monomers with multiple aziridinyl groups can be used that are reactive with carboxyl groups. For example, the crosslinkers can be a bis-amide crosslinker as described in U.S. Pat. No. 6,777,079 (Zhou et al.).

In other methods of crosslinking, photocrosslinkers (e.g., UV photocrosslinkers) are added. These photocrosslinkers can be copolymerizable with the various monomers used to form the elastomeric material (e.g., copolymerizable benzophenones) or can be added after polymerization. Suitable photocrosslinkers added after polymerization include, for example, multifunctional benzophenones, triazines (such as XL-330, which is 2,4,-bis(trichloromethyl)-6-(4-methoxyphenyl)-triazine from 3M Company, Saint Paul, Minn.), acetophenones, and the like.

In still other methods of crosslinking, thermal crosslinkers may be used, optionally in combination with suitable accelerants and retardants. Suitable thermal crosslinkers for use herein include, but are not limited to, isocyanates, more particularly trimerized isocyanates and/or sterically hindered isocyanates that are free of blocking agents, or else epoxide compounds such as epoxide-amine crosslinker systems. Advantageous crosslinker systems and methods are described e.g. in the descriptions of DE 202009013255 U1, EP 2 305 389 A1, EP 2 414 143 A1, EP 2 192 148 A1, EP 2 186 869 A1, EP 0 752 435 A1, EP 1 802 722 A1, EP 1 791 921 A1, EP 1 791 922 A1, EP 1 978 069 A1, and DE 10 2008 059 050 A1, the relevant contents of which are herewith incorporated by reference. Particularly advantageous crosslinker systems and methods are described in EP 0 752 435 A1 and EP 1 978 069 A1. Suitable accelerant and retardant systems for use herein are described e.g. in the description of US-A1-2011/0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under tradename UVACURE 1500.

If present, a crosslinker can be used in any suitable amount. In many aspects, the crosslinker is present in an amount of up 5 parts by weight based on a total weight of polymerizable material. In some aspects, the crosslinker is present in an amount up to 4 weight percent, up to 3 weight percent, up to 2 weight percent, or up to 1 weight percent. The crosslinker can be present, for example, in amounts greater than 0.01 weight percent, greater than 0.03 weight percent, greater than 0.05 weight percent, greater than 0.07 weight percent, or greater than 1 weight percent. In some aspects, the crosslinker is present in an amount in a range of 0 to 5 weight percent, 0.01 to 5 weight percent, 0.05 to 5 weight percent, 0 to 3 weight percent, 0.01 to 3 weight percent, 0.05 to 3 weight percent, 0 to 1 weight percent, 0.01 to 1 weight percent, or 0.05 to 1 weight percent. As another example, any of the polymerizable materials can include up to 5 weight percent crosslinker such as 0.01 to 5 weight percent, 0.05 to 5 weight percent, 0.07 to 5 weight percent, or 1 to 5 weight percent.

Aside from thermal, moisture or photosensitive crosslinking agents, crosslinking may also be achieved using high energy electromagnetic radiation such as gamma or e-beam radiation.

If tackifiers are used, then an amount up to about 50% by weight, preferably less than 30% by weight, and more preferably less than 5% by weight based on the dry weight of the total adhesive polymer is typically suitable. The type and amount of tackifier may affect properties such as contactability, bonding range, bond strength, heat resistance and specific adhesion.

Suitable tackifying resins include, for example, terpene phenolics, rosins, rosin esters, esters of hydrogenated rosins, synthetic hydrocarbon resins and combinations thereof. Especially suitable tackifying resins include the commercially available tackifying resins: FORAL 85E (a glycerol ester of highly hydrogenated refined gum rosin) commercially available from Eastman, Middelburg, NL), FORAL 3085 (a glycerol ester of highly hydrogenated refined wood rosin) commercially available from Hercules Inc., Wilmington, Del.; ESCOREZ 2520 and ESCOREZ 5615 (aliphatic/aromatic hydrocarbon resins) commercially available from ExxonMobil Corp., Houston, Tex.; and Regalite 7100 (a partially hydrogenated hydrocarbon resin) commercially available from Eastman, Kingsport, Tenn.

The (co)polymerizable material may contain a plasticizer, if desired. The plasticizer is typically selected to be compatible with (i.e., miscible with) the other components in the composition such as the polymerizable material and any optional tackifier. Suitable plasticizers include, but are not limited to, various polyalkylene oxides (e.g., polyethylene oxides or propylene oxides), adipic acid esters, formic acid esters, phosphoric acid esters, benzoic acid esters, phthalic acid esters, polyisobutylenes, polyolefins, and sulfonamides, or naphthenic oils.

The (co)polymerizable material precursor of the polymeric base material, may in some aspects further comprise a filler material which is preferably selected from the group consisting of filler particles, in particular expanded perlite, microspheres, expendable and expanded microspheres, glassbeads, glass microspheres, silica type fillers, hydrophobic silica type fillers, hydrophilic silica type fillers, hydrophobic fumed silica, hydrophilic fumed silica, fibers, electrically and/or thermally conducting particles, nanoparticles, in particular silica nanoparticles, and any combinations or mixtures thereof. The disclosure is however not that limited as alternative filler material may be easily identified by those skilled in the art, in the light of the present disclosure. In a particular aspect, the filler material, in particular the particulate filler material comprises hollow glass microspheres.

In a particular aspect of the present disclosure, the (co)polymerizable material precursor of the polymeric base material comprises a particulate filler material comprising a thermoplastic material. In a particular aspect, the thermoplastic material for use herein is selected from the group consisting of polyolefins, ethylene-vinyl acetate copolymers, polystyrenes, polyesters, and any combinations of mixtures thereof. In a more particular aspect, the thermoplastic material is selected from the group consisting of polyolefins, in particular low density or linear low density polyethylene, medium density polyethylene, high density polyethylene, polypropylene, polybutylene, and any polyolefin copolymers or terpolymers. In a preferred aspect, the thermoplastic material is selected from the group consisting of low density or linear low density polyethylene, and any combinations or mixtures thereof.

The filler material for use herein may be present in the (co)polymerizable material, in any suitable amounts. In some exemplary aspects, the filler material is present in amounts up to 30 parts by weight, up to 25 parts by weight, or even up to 20 parts by weight of the (co)polymerizable material. In some other exemplary aspects, this amount is typically of at least 1 part by weight, or at least 3 parts by weight of the (co)polymerizable material.

Accordingly, in some exemplary aspects, the filler material is present in amounts in a range of from 1 to 20 parts, from 3 to 15 parts by weight, or even from 5 to 13 parts by weight of the (co)polymerizable material.

As will be apparent to those skilled in the art of formulating pressure sensitive adhesives, the (co)polymerizable material may further include one or more conventional, but optional additives depending on the envisaged properties for the resulting pressure sensitive adhesive. Exemplary additional additives include, but are not limited to, one or more plasticizers, UV stabilizers, antistatic agents, colorants, antioxidants, fungicides, bactericides, organic and/or inorganic filler particles, pigments, dyes and any combinations thereof. Advantageously, the additional additives for use herein are non-polymerizable additives. As will be apparent to those skilled in the art, additional additives for use herein may be included at appropriate timing and in the appropriate polymeric or pre-polymeric matrix. Such additives can be used if they do not affect the superior properties of the pressure sensitive adhesives.

According to a preferred aspect of the present disclosure, the polymeric base material (and/or the polymeric foam layer) has a degree of conversion of at least 90%, at least 95%, or even at least 98%, when determined according to the test method described in the experimental section. As will be easily apparent to those skilled in the art, the degree of conversion is meant to refer to the conversion of the starting monomeric components into polymerized material. In that respect, a degree of conversion of 100% would correspond to a virtual completion of the polymerization, i.e., complete depletion of the starting monomeric components.

The degree of conversion is typically monitored during the irradiation by measuring the index of refraction of the polymerizing medium. The final degree of conversion may be for instance determined by measuring the residual monomer content of the polymeric base material by e.g. gravimetric determination.

In a preferred aspect of the pressure sensitive adhesive assembly according to the present disclosure, the polymeric foam layer has a complex viscosity comprised between 2,000 Pa·s and 60,000 Pa·s, between 2,500 Pa·s and 50,000 Pa·s, between 3,000 Pa·s and 40,000 Pa·s, between 3,500 Pa·s and 35,000 Pa·s, between 4,000 Pa·s and 30,000 Pa·s, between 4,000 Pa·s and 20,000 Pa·s, between 4,000 Pa·s and 15,000 Pa·s, or even between 4,000 Pa·s and 10,000 Pa·s, when measured at 120° C. according to the test method described in the experimental section.

In the context of the present disclosure, it has surprisingly been found a polymeric foam layer having the above-detailed complex viscosity ranges, is outstandingly suitable for bonding to a substrate provided with an uneven surface, due in particular to excellent surface wetting properties of the polymeric foam layer on substrates provided with uneven or irregular surfaces. These outstanding wetting characteristics provide the polymeric foam layer with excellent conformability properties to surfaces having challenging topologies such as e.g. cavities or curved surfaces.

According to one particular aspect of the present disclosure, the uneven surface is provided with at least one structure selected from the group consisting of cavities, holes, apertures, orifices, pits, openings, gaps, troughs, edges, depressions, and any combinations thereof.

In an exemplary aspect, the structure is substantially circular and has preferably a depth above 50 µm, above 100 µm, above 150 µm, above 200 µm, above 300 µm, above 400 µm, above 500 µm, above 600 µm, above 700 µm, above 800 µm, or even above 900 µm. In another particular aspect, the structure has a depth to diameter aspect ratio comprised between 0.03 and 0.20, between 0.04 and 0.17, between 0.04 and 0.14, between 0.05 and 0.13, or even between 0.07 and 0.11.

According to a preferred aspect of the pressure sensitive adhesive assembly of the present disclosure, the structure provided in the uneven surface is selected from the group of spot welds, laser beam welds, rivets, punch rivets, clinch points, round joints, point joints, and any combinations thereof. More preferably, the structure is selected from the group of spot welds.

According to an alternative aspect of the present disclosure, the uneven surface for use herein is selected from the group of curved surfaces, bended surfaces, twisted surfaces, angled surfaces, arched surfaces, arced surfaces, and any combinations thereof. In a particular aspect, the uneven surface is selected from the group of radii parts in car body, in particular radii panels.

Other uneven surfaces for use herein may be easily identified by those skilled in the art, in the light of the present disclosure. Materials for forming substrates provided with uneven surfaces are not particularly limited. Exemplary main materials used for forming substrates provided with uneven surfaces are typically selected from the group consisting of metals, plastics, reinforced plastics, composite materials, glass materials, clear coats, wood, coatings, and any combinations thereof.

In the context of the present disclosure, uneven surfaces provided on living substrates such as e.g. parts of human or animal bodies are typically excluded. Exemplary substrates provided with an uneven surface may typically be found in the automotive manufacturing industry, in the aerospace manufacturing industry, or in the construction industry.

According to a preferred execution, the pressure sensitive adhesive assembly according to the present disclosure further comprises a secondary layer superimposed to at least one major surface of the polymeric foam layer. In a more preferred execution, the secondary layer preferably comprises a rubber-based elastomeric material and takes the form of a rubber seal.

In a particular execution, the pressure sensitive adhesive assembly according to the present disclosure takes the form of skin/core type multilayer pressure sensitive adhesive assembly, wherein the core layer is the polymeric foam layer of the multilayer pressure sensitive adhesive assembly and the skin layer of the multilayer pressure sensitive adhesive assembly is a second pressure sensitive adhesive layer. According this specific execution, it is preferred that the second pressure sensitive adhesive layer has a lower thickness compared to the polymeric foam core layer. As a way of example, the thickness of the skin layer may typically be in the range from 20 µm to 250 µm, or even from 40 µm to 200 µm, whereas the thickness of the polymeric foam core layer may typically be in the range from 100 µm to 6000 µm, from 400 µm to 3000 µm, or even from 800 µm to 2000 µm. However, the thickness of the various layer(s) comprised in the pressure sensitive adhesive assembly may vary in wide ranges depending on the desired execution and associated properties. By way of example, the thickness can be independently chosen for each layer between 25 µm and 6000 µm, between 40 µm and 3000 µm, between 50 µm and 3000 µm, between 75 µm and 2000 µm, or even between 75 µm and 1500 µm.

According to one particular aspect, the pressure sensitive adhesive assembly according to the present disclosure is obtainable by subjecting the polymeric foam layer to a heating step at a temperature above the melting temperature of the thermoplastic material. According to a typical aspect, the temperature of the heating step is below the melting temperature of the polymeric base material.

According to an advantageous aspect, the heating step is performed at a heating rate of at least 5 K/s, at least 10 K/s, at least 30 K/s, at least 40 K/s, at least 50 K/s, at least 60 K/s, at least 80 K/s, at least 100 K/s, at least 120 K/s, at least 140 K/s, at least 160 K/s, at least 180 K/s, at least 200 K/s, at least 220 K/s, at least 240 K/s, or even at least 250 K/s.

According to another advantageous aspect, the heating step for use herein is performed at a heating rate of less than 250 K/s, less than 220 K/s, less than 200 K/s, less than 180 K/s, less than 160 K/s, or even less than 140 K/s.

The step of subjecting the polymeric foam layer to a heating step may be performed using any heating methods commonly known in the art. Suitable heating methods for use herein may be easily identified by those skilled in the art, in the light of the present disclosure. Heating methods for use herein include, but are not limited to, subjecting the polymeric foam layer to any of thermal heating, radiation heating, convection heating, induction heating, ultrasonic vibration heating, and any combinations thereof.

According to an advantageous aspect, the heating step is performed by subjecting the polymeric foam layer to any of induction heating, ultrasonic vibration heating, and any combinations thereof.

In one particularly preferred execution, the polymeric foam layer further comprises magnetic particles, and the heating step is performed by subjecting at least part of the magnetic particles to electromagnetic induction thereby induction heating the polymeric foam layer. Methods of subjecting magnetic particles to electromagnetic induction thereby induction heating polymeric adhesive layers are known per se. A suitable induction heating method is described e.g. in US-A1-2003/0168640 (Kirsten).

Advantageously, the magnetic particles for use herein are subjected to induction frequency above 100 kHz, above 200 kHz, above 400 kHz, above 600 kHz, or even above 800 kHz.

Advantageously, the magnetic particles for use herein are selected from the group consisting of paramagnetic particles, super-paramagnetic particles, ferrimagnetic particles, ferromagnetic particles, and any combinations or mixtures thereof. More advantageously, the magnetic particles for use herein are selected from the group consisting of ferrimagnetic particles, in particular ferrite or magnetite particles.

When present in the polymeric foam layer, the magnetic particles are preferably used in an amount comprised between 1 and 80 pphw, between 3 and 60 pphw, between 5 and 55 pphw, between 10 and 55 pphw, or even between 15 and 55 pphw, by weight of the polymeric base material. Advantageously still, the polymeric foam layer comprises magnetic particles in an amount below 55 pphw, below 50 pphw, below 40 pphw, below 30 pphw, or even below 20 pphw, by weight of the polymeric base material.

Magnetic particles for use herein may have any particular size. However, according to an advantageous aspect, the magnetic particles have an average primary particle size ($d_{50}$) below 150 μm, below 100 μm, below 80 μm, below 70 μm, below 60 μm, below 50 μm, below 40 μm, below 30 μm, below 20 μm, below 10 μm, below 5 μm, below 2 μm, below 1 μm or even below 0.5 μm.

In another particularly preferred execution, the heating step is performed by subjecting the polymeric foam layer to ultrasonic vibrations. Methods of subjecting polymeric adhesive layers to ultrasonic vibrations are known per se. A suitable heating method with ultrasonic vibrations is described e.g. in U.S. Pat. No. 3,480,492 (Hauser).

When using a heating step performed by subjecting the polymeric foam layer to, in particular induction heating or ultrasonic vibration heating, very fast heating rates may be achieved. This characteristic allows performing suitable heating step in very short timing and therefore allows embedding the heating step into automatic (dynamic) pressure sensitive tape application processes commonly used in industrial applications. The fast heating rates achievable when using in particular induction heating or ultrasonic vibration heating methods may be particularly beneficial in pressure sensitive tape application processes commonly used in the automotive manufacturing industry, in particular for taped seal on body, exterior parts attachment and weather-strip tape applications.

Furthermore, using a heating step performed by subjecting the polymeric foam layer to, in particular induction heating or ultrasonic vibration heating, enables more homogeneous heat distribution and/or contact-free, strongly localized heating.

According to an advantageous aspect, the pressure sensitive adhesive assembly according to the present disclosure, has a tack strength value of more than 150 N, more than 180 N, more than 200 N, more than 220 N, more than 240 N, more than 250 N, more than 260 N, more than 280 N, or even more than 300 N, when measured at room temperature according to the T-Plug test method described in the experimental section.

The particular pressure-sensitive adhesive compositions may be prepared by a variety of conventional free radical polymerization methods, including solution, bulk (i.e., with little or no solvent), dispersion, emulsion, and suspension processes. The particular method used may be influenced by the use of the final pressure sensitive adhesive composition. The reaction product of the polymerizable materials can be random or block copolymers.

In some methods of preparing the pressure sensitive adhesive composition(s) for the pressure sensitive adhesive assembly according to the disclosure, the (co)polymerizable material containing the monomers is partially polymerized so as to increase its viscosity to that corresponding to a viscous material. Generally, the main monomers and other optional monomers are mixed with a portion of the free radical polymerization initiator. Depending on the type of initiator added, the mixture is typically exposed to actinic radiation or heat to partially polymerize the monovalent monomers (i.e., monomers with a single ethylenically unsaturated group). Then, the crosslinker and any remaining portion of the initiator may be added to the partially polymerized material. Optional tackifiers and plasticizers may also be combined with the partially polymerized material. The resulting mixture can be more readily applied as a coating composition onto a support (e.g., release liner) or another layer (e.g., polymeric foam layer). It is preferable to coat the curable precursor of a pressure sensitive adhesive soon after preparation. The coating layer can then be exposed to actinic radiation if a photoinitator is present or to heat if a thermal initiator is present. Exposure to actinic radiation or heat typically results in the further reaction of polymerizable material within the coating composition.

Adhesive articles may be prepared by coating the curable precursor composition of a pressure sensitive adhesive on a suitable support, such as a flexible backing. The flexible backing material for use herein may be any material conventionally utilized as a tape backing, optical film or any other flexible material.

Examples of materials that can be included in the flexible backing include polyolefins such as polyethylene, polypropylene (including isotactic polypropylene), polystyrene, polyester, polyvinyl alcohol, poly(ethylene terephthalate), polybutylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly (propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure sensitive adhesive compositions such as labels, tapes, signs, covers, marking indicia, and the like.

The above-described precursor compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary as previously described.

The flexible support may also comprise a release-coated substrate. Such substrates are typically employed when an adhesive transfer tape is provided. Examples of release-coated substrates are well known in the art and include, by way of example, silicone-coated kraft paper and the like. Tapes of the invention may also incorporate a low adhesion backing (LAB), which are known in the art.

According to another aspect, the present disclosure is directed to a method of applying a pressure sensitive adhesive assembly to a substrate provided with an uneven surface, which comprises the steps of:
a) subjecting the polymeric foam layer as described above to a heating step;
b) contacting the heated polymeric foam layer obtained in step a) to the uneven surface of the substrate; and
c) allowing the polymeric foam layer to cool down on the substrate.

In the context of the present disclosure, the pressure sensitive adhesive assembly, the substrate provided with an uneven surface, the polymeric foam layer, the polymeric base material and the heating step for use in the method of applying a pressure sensitive adhesive assembly to a substrate provided with an uneven surface, may be different or strictly identical to those described above in reference to the pressure sensitive adhesive (PSA) assembly suitable for bonding to a substrate provided with an uneven surface according to a first aspect of the present disclosure.

According to one particular aspect of the method of applying a pressure sensitive adhesive assembly to a substrate provided with an uneven surface, the heating step is performed at a temperature below the melting temperature of the polymeric base material.

According to an advantageous aspect, the heating step is performed at a heating rate of at least 5 K/s, at least 10 K/s, at least 30 K/s, at least 40 K/s, at least 50 K/s, at least 60 K/s, at least 80 K/s, at least 100 K/s, at least 120 K/s, at least 140 K/s, at least 160 K/s, at least 180 K/s, at least 200 K/s, at least 220 K/s, at least 240 K/s, or even at least 250 K/s.

According to another advantageous aspect, the heating step for use herein is performed at a heating rate of less than 250 K/s, less than 220 K/s, less than 200 K/s, less than 180 K/s, less than 160 K/s, or even less than 140 K/s.

In a preferred aspect of the method, the heating step is performed by subjecting the polymeric foam layer to any of thermal heating, radiation heating, convection heating, induction heating, ultrasonic vibration heating, and any combination thereof. Advantageously, the heating step is performed by subjecting the polymeric foam layer to any of induction heating, ultrasonic vibration heating, and any combinations thereof.

In one particularly preferred execution, the polymeric foam layer further comprises magnetic particles, and the heating step is performed by subjecting at least part of the magnetic particles to electromagnetic induction thereby induction heating the polymeric foam layer. Advantageously, the magnetic particles for use herein are selected from the group consisting of paramagnetic particles, superparamagnetic particles, ferrimagnetic particles, ferromagnetic particles, and any combinations or mixtures thereof. More advantageously, the magnetic particles are selected from the group consisting of ferrimagnetic particles, in particular ferrite or magnetite particles.

According to another preferred execution, the heating step is performed by subjecting the polymeric foam layer to ultrasonic vibrations.

In still another aspect, the present invention relates to the use of a pressure sensitive adhesive assembly as described above, for the bonding to a substrate provided with an uneven surface.

In yet another aspect, the present invention relates to the use of a pressure sensitive adhesive assembly or of a method as described above, for industrial applications, in particular for construction applications and automotive applications, more in particular for taped seal on body, taped seal on door, exterior and interior parts attachment and weather-strip tape applications for the automotive industry.

A pressure sensitive adhesive assembly or a method as described above may alternatively be used for rubber seal attachment to hang on parts (such as e.g. doors, hood, trunklid) or to body/structure/chassis.

Item 1 is a pressure sensitive adhesive (PSA) assembly suitable for bonding to a substrate provided with an uneven surface, wherein the pressure sensitive adhesive (PSA) assembly comprises a polymeric foam layer comprising a polymeric base material and having a complex viscosity comprised between 2,000 Pa·s to 80,000 Pa·s, when measured at 120° C. according to the test method described in the experimental section.

Item 2 is a pressure sensitive adhesive assembly according to item 1, wherein the polymeric foam layer has a complex viscosity comprised between from 2,000 Pa·s to 60,000 Pa·s, between 2,500 Pa·s to 50,000 Pa·s, between 3,000 Pa·s to 40,000 Pa·s, between 3,500 Pa·s to 35,000 Pa·s, between 4,000 Pa·s to 30,000 Pa·s, between 4,000 Pa·s to 20,000 Pa·s, between 4,000 Pa·s to 15,000 Pa·s, or even between 4,000 Pa·s to 10,000 Pa·s, when measured at 120° C. according to the test method described in the experimental section.

Item 3 is a pressure sensitive adhesive assembly according to any of item 1 or 2, wherein the polymeric base material has a degree of conversion of at least 90%, at least 95%, or even at least 98%, when determined according to the test method described in the experimental section.

Item 4 is a pressure sensitive adhesive assembly according to any of the preceding items, wherein the uneven surface is provided with at least one structure selected from the group consisting of cavities, holes, apertures, orifices, pits, openings, gaps, troughs, edges, depressions, and any combinations thereof.

Item 5 is a pressure sensitive adhesive assembly according to item 4, wherein the structure is substantially circular and has preferably a depth above 50 μm, above 100 μm, above 150 μm, above 200 μm, above 300 μm, above 400 μm, above 500 μm, above 600 μm, above 700 μm, above 800 μm, or even above 900 μm.

Item 6 is a pressure sensitive adhesive assembly according to any of item 4 or 5, wherein the structure has a depth to diameter aspect ratio comprised between 0.03 and 0.20, between 0.04 and 0.17, between 0.04 and 0.14, between 0.05 and 0.13, or even between 0.07 and 0.11.

Item 7 is a pressure sensitive adhesive assembly according to any of items 4 to 6, wherein the structure is selected from the group of spot welds, laser beam welds, rivets, punch rivets, clinch points, round joints, point joints, and any combinations thereof.

Item 8 is a pressure sensitive adhesive assembly according to any of the preceding items, wherein the uneven surface is selected from the group of curved surfaces, bended surfaces, twisted surfaces, angled surfaces, arched surfaces, arced surfaces, and any combinations thereof.

Item 9 is a pressure sensitive adhesive assembly according to item 8, wherein the uneven surface is selected from the group of radii parts in car body, in particular radii panels.

Item 10 is a pressure sensitive adhesive assembly according to any of the preceding items, wherein the substrate comprises a main material selected from the group consisting of metals, plastics, reinforced plastics, composite materials, glass materials, clear coats, wood, coatings, and any combinations thereof.

Item 11 is a pressure sensitive adhesive assembly according to any of the preceding items, which further comprises a secondary layer superimposed to at least one major surface of the polymeric foam layer, and wherein the secondary layer preferably comprises a rubber-based elastomeric material.

Item 12 is a pressure sensitive adhesive assembly according to any of the preceding items, which is obtainable by subjecting the polymeric foam layer to a heating step.

Item 13 is a pressure sensitive adhesive assembly according to item 12, wherein the heating step is performed at a heating rate of at least 5 K/s, at least 10 K/s, at least 30 K/s, at least 40 K/s, at least 50 K/s, at least 60 K/s, at least 80 K/s, at least 100 K/s, at least 120 K/s, at least 140 K/s, at least 160 K/s, at least 180 K/s, at least 200 K/s, at least 220 K/s, at least 240 K/s, or even at least 250 K/s.

Item 14 is a pressure sensitive adhesive assembly according to item 12, wherein the heating step is performed at a heating rate of less than 250 K/s, less than 220 K/s, less than 200 K/s, less than 180 K/s , less than 160 K/s, or even less than 140 K/s.

Item 15 is a pressure sensitive adhesive assembly according to any of items 12 to 14, wherein the heating step is performed by subjecting the polymeric foam layer to any of thermal heating, radiation heating, convection heating, induction heating, ultrasonic vibration heating, and any combinations thereof.

Item 16 is a pressure sensitive adhesive assembly according to item 15, wherein the heating step is performed by subjecting the polymeric foam layer to any of induction heating, ultrasonic vibration heating, and any combinations thereof.

Item 17 is a pressure sensitive adhesive assembly according to any of items 12 to 16, wherein the polymeric foam layer further comprises magnetic particles, and wherein the heating step is performed by subjecting at least part of the magnetic particles to electromagnetic induction thereby induction heating the polymeric foam layer.

Item 18 is a pressure sensitive adhesive assembly according to item 17, wherein the magnetic particles are selected from the group consisting of paramagnetic particles, superparamagnetic particles, ferrimagnetic particles, ferromagnetic particles, and any combinations or mixtures thereof.

Item 19 is a pressure sensitive adhesive assembly according to any of item 17 or 18, wherein the magnetic particles are selected from the group consisting of ferrimagnetic particles, in particular ferrite or magnetite particles.

Item 20 is a pressure sensitive adhesive assembly according to any of items 17 to 19, wherein the polymeric foam layer comprises magnetic particles in an amount comprised between 1 and 80 pphw, between 3 and 60 pphw, between 5 and 55 pphw, between 10 and 55 pphw, or even between 15 and 55 pphw, by weight of the polymeric base material.

Item 21 is a pressure sensitive adhesive assembly according to any of items 17 to 20, wherein the polymeric foam layer comprises magnetic particles in an amount below 55 pphw, below 50 pphw, below 40 pphw, below 30 pphw, or even below 20 pphw, by weight of the polymeric base material.

Item 22 is a pressure sensitive adhesive assembly according to any of items 17 to 21, wherein the magnetic particles have an average primary particle size ($d_{50}$) below 150 μm, below 100 μm, below 80 μm, below 70 μm, below 60 μm, below 50 μm, below 40 μm, below 30 μm, below 20 μm, below 10 μm, below 5 μm, below 2 μm, below 1 μm or even below 0.5 μm.

Item 23 is a pressure sensitive adhesive assembly according to any of items 12 to 16, wherein the heating step is performed by subjecting the polymeric foam layer to ultrasonic vibrations.

Item 24 is a pressure sensitive adhesive assembly according to any of the preceding items, wherein the polymer base material is selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, halogenated polymers and any combinations, copolymers or mixtures thereof.

Item 25 is a pressure sensitive adhesive assembly according to any of the preceding items, wherein the main monomer component of the polymer base material is selected from the group consisting of (meth)acrylate esters, (meth)acrylate monoesters of polyhydroxy alkyl alcohols, multifunctional (meth)acrylate esters, macromeric (meth)acrylates, (meth)acrylic acids and their salts, nitrogen-bearing monomers, dibasic acid monomers, vinyl esters, styrenes and ring-substituted styrenes, vinyl halides and vinylidene halides, vinyl ethers, and any combinations or mixtures thereof.

Item 26 is a pressure sensitive adhesive assembly according to any of the preceding items, wherein the polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

Item 27 is a pressure sensitive adhesive assembly according to any of the preceding items, wherein the polymer base material selected from the group consisting of polyacrylates whose main monomer component comprises a linear or branched alkyl (meth)acrylate ester selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl(meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

Item 28 is a pressure sensitive adhesive assembly according to any of the preceding items, wherein the polymer base material selected from the group consisting of polyacrylates whose main monomer component is selected from the group consisting of iso-octyl (meth)acrylate, 2-ethylhexyl (meth)acrylate, 2-propylheptyl (meth)acrylate, 2-octyl (meth)acrylate, butyl acrylate, and any combinations or mixtures thereof; more preferably from the group consisting of iso-octyl acrylate, 2-ethylhexyl acrylate, 2-octyl acrylate, and 2-propylheptyl acrylate.

Item 29 is a pressure sensitive adhesive assembly according to any of the preceding items, wherein the polymer base material selected from the group consisting of polyacrylates whose main monomer component is selected from the group consisting of 2-ethylhexyl acrylate, and iso-octyl acrylate.

Item 30 is a pressure sensitive adhesive assembly according to any of the preceding items, wherein the polymer base material further comprises a co-monomer having an ethylenically unsaturated group, which is preferably a polar co-monomer, more preferably a polar acrylate, even more preferably selected from the group consisting of acrylic acid, methacrylic acid, itaconic acid, hydroxyalkyl acrylates, acrylamides and substituted acrylamides, acrylamines and substituted acrylamines and any combinations or mixtures thereof.

Item 31 is a pressure sensitive adhesive assembly according to any of the preceding items, wherein the polymeric foam layer further comprises a filler material which is preferably selected from the group consisting of filler particles, in particular expanded perlite, microspheres, expendable and expanded microspheres, glassbeads, glass microspheres, silica type fillers, hydrophobic silica type fillers, hydrophilic silica type fillers, hydrophobic fumed silica, hydrophilic fumed silica, fibres, electrically and/or thermally conducting particles, nanoparticles, in particular silica nanoparticles, and any combinations or mixtures thereof.

Item 32 is a pressure sensitive adhesive assembly according to item 31, wherein the particulate filler material comprises hollow glass microspheres.

Item 33 is a pressure sensitive adhesive assembly according to any of the preceding items, which has a tack strength value of more than 150 N, more than 180 N, more than 200 N, more than 220 N, more than 240 N, more than 250 N, more than 260 N, more than 280 N, or even more than 300 N, when measured at room temperature according to the T-Plug test method described in the experimental section.

Item 34 is a method of applying a pressure sensitive adhesive assembly to a substrate provided with an uneven surface, which comprises the steps of:
a) subjecting the polymeric foam layer as described in any of the preceding items to a heating step;
b) contacting the heated polymeric foam layer obtained in step a) to the uneven surface of the substrate; and
c) allowing the polymeric foam layer to cool down on the substrate.

Item 35 is a method according to item 34, wherein the heating step is performed at a heating rate of at least 5 K/s, at least 10 K/s, at least 30 K/s, at least 40 K/s, at least 50 K/s, at least 60 K/s, at least 80 K/s, at least 100 K/s, at least 120 K/s, at least 140 K/s, at least 160 K/s, at least 180 K/s, at least 200 K/s, at least 220 K/s, at least 240 K/s, or even at least 250 K/s.

Item 36 is a method according to item 35, wherein the heating step is performed at a heating rate of less than 250 K/s, less than 220 K/s, less than 200 K/s, less than 180 K/s, less than 160 K/s, or even less than 140 K/s.

Item 37 is a method according to any of item 35 or 36, wherein the heating step is performed by subjecting the polymeric foam layer to any of thermal heating, radiation heating, convection heating, induction heating, ultrasonic vibration heating, and any combinations thereof.

Item 38 is a method according to item 37, wherein the heating step is performed by subjecting the polymeric foam layer to any of induction heating, ultrasonic vibration heating, and any combinations thereof.

Item 39 is a method according to any of items 34 to 38, wherein the polymeric foam layer further comprises magnetic particles, and wherein the heating step is performed by subjecting at least part of the magnetic particles to electromagnetic induction thereby induction heating the polymeric foam layer.

Item 40 is a method according to item 39, wherein the magnetic particles are selected from the group consisting of paramagnetic particles, super-paramagnetic particles, ferrimagnetic particles, ferromagnetic particles, and any combinations or mixtures thereof.

Item 41 is a method according to any of item 39 or 40, wherein the magnetic particles are selected from the group consisting of ferrimagnetic particles, in particular ferrite or magnetite particles.

Item 42 is a method according to any of items 34 to 38, wherein the heating step is performed by subjecting the polymeric foam layer to ultrasonic vibrations.

Item 43 is the use of a pressure sensitive adhesive assembly according to any of items 1 to 33, for the bonding to a substrate provided with an uneven surface.

Item 44 is the use of a pressure sensitive adhesive assembly according to any of items 1 to 33 or of a method according to any of items 34 to 42, for industrial applications, in particular for construction applications and automotive applications, more in particular for taped seal on body, taped seal on door, exterior and interior parts attachment and weather-strip tape applications for the automotive industry.

EXAMPLES

The invention is further illustrated by the following examples. These examples are merely for illustrative purposes only and are not meant to be limiting on the scope of the appended claims.

Test Methods Applied:
Complex Viscosity@120° C.:

All complex viscosity measurements are conducted with a standard rheometer, RDAII (Rheoservice, Germany) in plate-plate geometry, wherein the plate diameter is 8 mm. Temperature control is achieved by using an oven at a heating rate of 20 K/min. Deformation of 1% is applied at an oscillation frequency of 1 Hz. Viscosity is monitored continuously during the measurement from room temperature up to 160° C. For further evaluation, viscosity values at 20° C. and 120° C. are determined and recorded.

Degree of Conversion (By Gravimetric Determination)

Test samples having the following dimension 4×4 cm are cut out and placed in an oven (commercially available from Hereaus) at 120° C.+/−2° C. for 120 minutes+/−5 minutes. The specimens are weighted in a precision balance (commercially available from Sartorius) before and after heat treatment. The test results (weight loss) are expressed in wt % and represent the average of two measurements.

T-Plug Test Method

The wetting (or application) performance in uneven surface is determined in home-made spot weld T-Plug testing. An aluminium panel coated with an automotive clearcoat (CC5.3) is mechanically treated for creating uneven surface comprising discrete topology simulating spot welds.

For test sample preparation, two spot welds are mechanically pressed on a clearcoat coated panel of 48 mm×25 mm. The spot welds have a diameter of 5 mm and a depth of 600 μm. The two spot welds are placed in a centre position with 5 mm distance from the edge and 5 mm distance between each spot weld. For testing, a polymeric foam strip of 25 mm×10 mm is placed on the two spot welds after the polymeric foam core strip has been subjected to the selected heating step (e.g. oven, induction heating, ultrasonic heating or IR heating). The temperature of the polymeric foam strip after the heating step shall be kept between 120° C. and 140° C. during application.

Immediately after the polymeric foam test strip has been placed on the uneven surface of the test panel, an aluminum T-Block, pre-heated at 120° C. in a conventional oven, is adjusted on top of the polymeric foam layer in such a way that the foam layer is centered on the surface of the aluminium T-Block, which is 25 mm×25 mm in size. The T-Block is then brought onto the open adhesive surface and the overstanding edges are cut off. A force of 300 N+/−5N for 15 seconds is then applied onto the prepared test sample.

Before joining to the tape and the uneven substrate, the aluminum T-Block surface is roughened with a ScotchBrite 4774 cleaning sponge and is thereafter cleaned with pure isopropanol. The cleaned aluminum T-Block test surface is then further pretreated with a commercially available 3M Primer P94 to avoid pop-off aluminum failures during testing.

The test is carried out at ambient room temperature (23° C.+/−2° C. and 50%+/−5% relative humidity). After a dwell time of 24 hours at ambient room temperature (23° C.+/−2° C. and 55%+/−5% relative humidity), the test sample is tested at room temperature in a Zwick tensile tester (Model Z020 commercially available from Zwick/Roell GmbH, Ulm, Germany) by performing a tensile test at 100 mm/min. The maximal forces are then collected.

Test Panels/Substrates Used for Testing:
a) Aluminum T-Blocks: AlMg3, T-Profile, dimension of 25 mm×25 mm and a height of 25 mm with 10 mm wide drilled hole; material thickness 3 mm.

The aluminium T-Blocks are cleaned as follows. First, aluminum T-Block surface is roughened with a ScotchBrite 4774 sponge and then cleaned with pure isopropanol. The cleaned aluminum T-Block test surface is further pretreated with a commercially available 3M Primer P94.

b) CeramiClear5 coated panels available from PPG Industries.

The clearcoat includes acrylic resins and polyesters used alone or with mixtures of copolymers comprising hydroxy- or glycidyl-functionalities or carbamatic acid residues (groups); or copolymers of acrylic acid and methacrylic acid esters with hydroxyl groups, free acid groups and further co-monomers (e.g. styrene). Panels are cut prior to 90° peel testing to the requested dimension.

Before testing, the automotive clear coat coated panels are cleaned with a 1:1 mixture of distilled water and isopropanol. Test panels are then rubbed dry with a paper tissue.

Raw Materials:

In the examples, the following raw materials are used:
2-Ethyl hexyl acrylate (C8-acrylate, 2-EHA): is an ester of 2-ethylalcohol and acrylic acid which is obtained from BASF SE, Germany.
Acrylic acid (AA) is obtained from Arkema, Italy.
1,6-Hexanedioldiacrylate (HDDA) is a fast curing diacrylate obtained from BASF SE, Germany.
Omnirad BDK 2,2-dimethoxy-2-phenylacetophenone is a UV-initiator for radical polymerization, commercially available from iGm resins, Waalwijk Netherlands.
MagniF25 (F25) are iron oxide magnetic particles, commercially available from LKAB Minerals (Sweden).
Low density polyethylene (LDPE) is a particulate filler material, commercially available from A. Schulmann Inc. (The Netherlands) under tradename ICORENE N2170.
3M Glass bubbles (K15) are hollow glass bubbles with a diameter of 115 μm, available from 3M, Germany.
Aerosil R-972 are hydrophobic fumed silica particles, available from Evonik, Germany.

Preparation of the Polymeric Foam Layers:

The polymeric foam layers PF1 to PF8 are prepared by initially pre-polymerizing the C8 acrylate (2-EHA) and 0.04 pph of Omnirad BDK as a photoinitiator in a glass vessel. Before the UV exposure is initiated, the mixture is flushed 10 minutes with nitrogen and nitrogen is also bubbled into the mixture the whole time until the polymerization process is stopped by adding air to the polymer precursor. All the time, the mixture is stirred with a propeller stirrer (300 U/min) and the reaction is stopped when a viscosity around 4500 mPas is reached (when measured with a Brookfield viscosimeter, T=25° C., spindle 4, 12 rpm). Additionally, the remaining amount of 0.36 pph Omnirad BDK, 0.1 pph HDDA crosslinker, the selected amount of glass bubbles K15, the selected amount of Aerosil 972, the selected amount of acrylic acid, and optionally, the selected amount of F25 magnetic particles and the selected amount of LDPE thermoplastic filler are added to the polymer precursor composition and homogenized using a mechanical stirrer for 15 minutes and degassed under vacuum for 15 more using a dessicator.

The exact formulations of the curable precursors are later listed (in pph) in Table 2 below.

The curable precursors are coated to a thickness of 1200 μm on a 75 μm solvent free siliconized PET-liner (SLVK-Liner, 300 mm×300 mm) with a coating knife of a lab coater. Curing is effected in a two stage UV-curing station both from the top, i.e. in a direction towards the exposed curable precursor layer, and bottom side. The radiation is provided by fluorescent lamps at a wavelength between 300-400 nm with a maximum at 351 nm. The total radiation intensity irradiated cumulatively from top and bottom is listed in Table 1. The UV-radiation curing of the curable precursors is done both, from the top and bottom side, hereby the UV intensity is set at equal levels in all zones.

TABLE 1

|  | Curing stage 1 | Curing stage 2 |
|---|---|---|
| Total intensity [mW/cm$^2$] | 5.8 (3.1 top 2.7 bottom) | 8.0 (4 top 4 bottom) |
| Total time [minutes] | 0.24 | 0.12 |

Formulations of the Curable Precursors used for Making the Polymeric Foam Layers The formulations of the curable precursors used for making the polymeric foam layers PF1 to PF8 are listed in Table 2 below.

TABLE 2

| Curable precursor | Monomer | | Photo-initiator | Cross-linker | Filler | | | |
|---|---|---|---|---|---|---|---|---|
|  | 2-EHA wt % | AA wt % | BDK pph | HDDA pph | K15 pph | R-972 pph | LDPE pph | F25 pph |
| PF1 | 88 | 12 | 0.40 | 0.1 | 9 | 5 | 0 | 0 |
| PF2 | 90 | 10 | 0.40 | 0.1 | 12 | 5 | 0 | 0 |
| PF3 | 88 | 12 | 0.40 | 0.1 | 9 | 5 | 30 | 0 |
| PF4 | 90 | 10 | 0.40 | 0.1 | 4 | 5 | 40 | 0 |
| PF5 | 90 | 10 | 0.40 | 0.1 | 6 | 5 | 40 | 10 |
| PF6 | 90 | 10 | 0.40 | 0.1 | 4 | 5 | 40 | 10 |
| PF7 | 90 | 10 | 0.40 | 0.1 | 12 | 5 | 0 | 10 |
| PF8 | 90 | 10 | 0.40 | 0.1 | 6 | 3 | 0 | 15 |

The polymeric foam layers thus prepared are laminated on a non-frothed pressure sensitive adhesive (skin) layer prepared from a solution. The monomer composition used for the pressure sensitive adhesive (skin) layer is described in Table 3 below.

TABLE 3

| Material | Amount |
|---|---|
| Isooctylacrylate | 60 ppH |
| Acrylic acid | 5 ppH |
| Methylacrylate | 35 ppH |

The pressure sensitive adhesive (skin) layer had a thickness of 70 μm. The lamination is carried out at a temperature of 100° C. by the use of a laminator from the company Sallmetall. The contact pressure is between 1-2 bar with a velocity of 1 m/min. The film is subjected twice to this procedure. The finalized dual-layer pressure sensitive adhesive assemblies have a thickness of about 1300 μm. After the lamination, the dual-layer PSA assemblies dwelled for 24 h at room temperature (23° C.+/−2° C.) before further processing.

Test Results:

a) SW-T-Plug Testing, 600 μm Spotweld, Heating in Oven

The peel results of the pressure sensitive adhesive assemblies made from polymeric foam layers PF1 to PF4 (respectively examples E1 to E4) are shown in Table 4 below. Results are shown for pressure sensitive adhesive assemblies before (room temperature) and after heating treatment of the polymeric foam strip at 120° C. in a conventional oven.

TABLE 4

| Curable precursor | Treatment | SW-T-Peel Test values F(tack)/N |
|---|---|---|
| E1 | RT | 177 |
|  | 120° C. | 268 |
| E2 | RT | 161 |
|  | 120° C. | 210 |
| E3 | RT | 209 |
|  | 120° C. | 299 |
| E4 | RT | 207 |
|  | 120° C. | 275 |

The results summarized in Table 4 show the improved peel performance (up to 30% improvement) achieved with pressure sensitive adhesive assemblies according to the present disclosure (i.e. E1 to E4 subjected to heating treatment in a conventional oven at 120° C.) when compared to pressure sensitive adhesive assemblies not according to the present disclosure (i.e. E1 to E4 not subjected to any heating treatment).

b) SW-T-Plug Testing, 600 μm Spotweld, Induction Heating

The peel results of the pressure sensitive adhesive assemblies made from polymeric foam layers PF5 to PF8 (respectively examples E5 to E8) are shown in Table 5 below. Results are shown for pressure sensitive adhesive assemblies before (room temperature) and after induction heating treatment of the polymeric foam strip at 120° C. For testing purposes, the aluminum T-Blocks used herein have been pre-heated at 120° C. in a conventional oven before being applied onto the induction heated polymeric foam test strip.

TABLE 5

| Curable precursor | Treatment | SW-T-Peel Test values F(tack)/N |
|---|---|---|
| E5 | RT | 172 |
|  | 120° C. | 213 |
| E6 | RT | 172 |
|  | 120° C. | 235 |
| E7 | RT | 142 |
|  | 120° C. | 185 |
| E8 | RT | 83 |
|  | 120° C. | 174 |

The results summarized in Table 5 show the improved peel performance (up to 110% improvement) achieved with pressure sensitive adhesive assemblies according to the present disclosure (i.e. E5 to E8 subjected to induction heating treatment at 120° C.) when compared to pressure sensitive adhesive assemblies not according to the present disclosure (i.e. E5 to E8 not subjected to any heating treatment).

The invention claimed is:

1. A method of applying a pressure sensitive adhesive assembly to a substrate provided with an uneven surface, which comprises the steps of:
   providing a pressure sensitive adhesive (PSA) assembly suitable for bonding to a substrate provided with an uneven surface, wherein the pressure sensitive adhesive (PSA) assembly comprises a polymeric foam layer comprising a polymeric base material, and having a complex viscosity comprised between 2,000 Pa·s to 80,000 Pa·s, when measured at 120° C. according to the test method described in the experimental section;
   subjecting the polymeric foam layer to a heating step;
   contacting the heated polymeric foam layer obtained in step a) to the uneven surface of the substrate; and
   allowing the polymeric foam layer to cool down on the substrate.

2. A method according to claim 1, wherein the heating step is performed at a heating rate of at least 5 K/s.

3. A method according to claim 1, wherein the heating step is performed by subjecting the polymeric foam layer to any of thermal heating, radiation heating, convection heating, induction heating, ultrasonic vibration heating, and any combinations thereof.

4. A method according to claim 1, which has a complex viscosity comprised between 2,500 Pa·s to 50,000 Pa·s when measured at 120° C. according to the test method described in the experimental section.

5. A method according to claim 1, wherein the polymeric foam layer has a degree of conversion of at least 90% when determined according to the test method described in the experimental section.

6. A method according to claim 1, wherein the uneven surface is provided with at least one structure selected from the group consisting of cavities, holes, apertures, orifices, pits, openings, gaps, troughs, edges, depressions, and any combinations thereof.

7. A method according to claim 6, wherein the structure is selected from the group of spot welds, laser beam welds, rivets, punch rivets, clinch points, round joints, point joints, and any combinations thereof.

8. A method according to claim 1, wherein the uneven surface is selected from the group of curved surfaces, bended surfaces, twisted surfaces, angled surfaces, arched surfaces, arced surfaces, and any combinations thereof.

9. A method according to claim 1, wherein the substrate comprises a main material selected from the group consisting of metals, plastics, reinforced plastics, composite materials, glass materials, clear coats, wood, coatings, and any combinations thereof.

10. method according to claim 1, which is obtainable by subjecting the polymeric foam layer to a heating step.

11. A method according to claim 10, wherein the heating step is performed at a heating rate of at least 5 K/s.

12. A method according to claim 10, wherein the heating step is performed by subjecting the polymeric foam layer to any of thermal heating, radiation heating, convection heating, induction heating, ultrasonic vibration heating, and any combinations thereof.

13. A method according to claim 12, wherein the heating step is performed by subjecting the polymeric foam layer to any of induction heating, ultrasonic vibration heating, and any combinations thereof.

14. A method according to claim 1, wherein the polymer base material is selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, halogenated polymers and any combinations, copolymers or mixtures thereof.

15. A method according to claim 1, which has a tack strength value of more than 150 N when measured at room temperature according to the T-Plug test method described in the experimental section.

* * * * *